(12) United States Patent
Kraenzlein et al.

(10) Patent No.: US 8,170,761 B2
(45) Date of Patent: May 1, 2012

(54) METHOD FOR REAL-TIME LEARNING OF ACTUATOR TRANSFER CHARACTERISTICS

(75) Inventors: Jeremy J. Kraenzlein, Northville, MI (US); Quan Zheng, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 1094 days.

(21) Appl. No.: 12/041,219

(22) Filed: Mar. 3, 2008

(65) Prior Publication Data
US 2009/0222180 A1    Sep. 3, 2009

(51) Int. Cl.
*G06F 19/00* (2011.01)
(52) U.S. Cl. ............................................. 701/59; 701/58
(58) Field of Classification Search .................... 701/51, 701/55, 56, 58–60
See application file for complete search history.

(56) References Cited

U.S. PATENT DOCUMENTS

| | | | |
|---|---|---|---|
| 5,737,979 A | 4/1998 | McKenzie et al. | |
| 6,526,941 B1 | 3/2003 | McDonald et al. | |
| 6,565,064 B2 | 5/2003 | Smith et al. | |
| 6,588,394 B2 | 7/2003 | Zheng | |
| 6,612,287 B2 | 9/2003 | Pursifull | |
| 6,622,080 B2 | 9/2003 | Yang et al. | |
| 6,671,641 B1 | 12/2003 | Collins et al. | |
| 6,679,800 B1 | 1/2004 | Ishii et al. | |
| 6,751,542 B2 | 6/2004 | Ishii et al. | |
| 6,779,540 B2 | 8/2004 | Ishii et al. | |
| 6,807,472 B2 | 10/2004 | Ford et al. | |
| 6,895,798 B2 | 5/2005 | Sosnowski | |
| 7,117,079 B2* | 10/2006 | Streichsbier et al. | 701/114 |
| 7,373,234 B1* | 5/2008 | Hwang et al. | 701/60 |
| 7,474,948 B2* | 1/2009 | Sandstrom | 701/51 |
| 7,925,407 B2* | 4/2011 | Kondo et al. | 701/51 |
| 7,979,184 B2* | 7/2011 | Dickinson et al. | 701/55 |
| 2003/0183280 A1* | 10/2003 | Ishii et al. | 137/487.5 |

OTHER PUBLICATIONS

SAE Technical Paper Series, 2000-01-1149, "Transmission Clutch Pressure Control System: Modeling, Controller Development and Implementation," Quan Zheng and Krishnaswamy Srinivasan, SAE 2000 World Congress, Detroit, Michigan, Mar. 6-9, 2000.

* cited by examiner

Primary Examiner — Drew Brown
(74) Attorney, Agent, or Firm — Thomas N. Twomey (57) ABSTRACT

In a pressure control system having a solenoid-operated fluid valve that has an output hydraulic pressure which varies in accordance with a solenoid input signal, a dynamic learning block is configured to adjust the initial, default values for control points stored in a pressure-current (P-I) data table based on observed (measured) operating points that reflect the solenoid's actual transfer characteristic. A feed forward control block is configured to generate the solenoid input signal having a level based on the adjusted control points in the data table, which improves the accuracy of the solenoid input signal. An adjustment method uses a plurality of circular buffers each configured to store observed operating points falling within a respective range, and provides a mechanism to allow adjustment of the control points based on only partial data.

33 Claims, 6 Drawing Sheets

*Prior Art*

*Fig. 10*

METHOD FOR REAL-TIME LEARNING OF ACTUATOR TRANSFER CHARACTERISTICS

TECHNICAL FIELD

The invention relates generally to improvements in fluid pressure controls and, more particularly, to a system and method involving dynamic learning of solenoid P-I curves suitable for use in closed loop pressure controls.

BACKGROUND OF THE INVENTION

Hydraulic fluid controls can be found in a variety of automotive applications such as automatic speed change transmissions as well as others. In these applications, it is often desirable to control the pressure of the hydraulic fluid. For example, in a common configuration, an electronic transmission control unit (TCU) for an automatic speed change transmission is configured to generate electrical signals that control solenoids, which in turn results in the control of fluid flow as well as the pressure in various hydraulic fluid lines. The pressure in a hydraulic fluid line can be used to control various other elements including, for example, a hydraulically-actuated clutch for the engagement of individual gears. By engaging various combinations of gears (e.g., planetary gears in a planetary gear transmission), an automatic transmission accomplishes the same task as the shifting of gears in a manual transmission.

In the automatic transmission example, it is also known to provide a solenoid-operated fluid valve, or as often referred to in this context as simply a solenoid (or sometimes actuator). For example, the solenoid can be used to control the hydraulic fluid pressure to apply and/or release the clutch. In a linear solenoid, the amount of fluid at a controlled pressure can be varied by changing a solenoid control current. To achieve control of a system including a linear solenoid, it is known to employ software responsive to various inputs to control the current applied to the solenoid. Various configurations including a linear solenoid are known, including a so-called 2-stage arrangement where a linear solenoid is used to provide a pilot pressure, which is in turn used to control a spool valve or the like, also resulting in the hydraulic fluid pressure at the spool valve outlet being controlled.

It is further known to control the operation of these solenoid-operated valves in either an open-loop control system or in a closed-loop control system. In a conventional open loop control system, it is conventional to employ extensive characterization strategies to characterize the transfer characteristic of the solenoid to the greatest extent possible in order to deliver accurate pressure control. That is, much effort is done in advance of the actual use of the solenoid to develop a highly accurate pressure-current (P-I) data table or map. In a closed loop control system, however, extensive characterization is not normally required. This is because typically encountered levels of variation (i.e., error in the actual output pressure relative to a desired output) can be reduced to manageable levels through feedback. Sometimes, however, the encountered variation can exceed the correction capabilities of the closed loop feedback control system, causing instability and/or poor performance. There are many causes. Occasionally there are significant part-to-part variations in the transfer characteristic of the solenoid, for example, as a result of manufacturing. Additionally, the actual transfer characteristic can vary based on factors that apply after manufacture/deployment, such as changes with temperature, fluid quality, supply pressure, the age of the solenoid as well as its wear/usage, among other factors.

Approaches taken in the art have focused on either (i) refining the post-manufacture, pre-deployment accuracy of a solenoid's transfer characteristic (e.g., P-I table), which is then used in generating a feed forward input control signal, or in (ii) refining the closed-loop feedback strategy itself. For example, as to the former approach, it is known to provide a one-time post-manufacture calibration of a solenoid's P-I map, as seen by reference to U.S. Pat. No. 6,751,542 entitled "CORRECTIVE CONTROL SYSTEM AND METHOD FOR LIQUID PRESSURE CONTROL APPARATUS IN AUTOMATIC TRANSMISSION" to Ishii et al. However, the refined P-I map is static once it has been calculated. Accordingly, Ishii et al. do not provide a mechanism to address variations that occur during real-time usage of the solenoid and/or over time. Moreover, the approach disclosed in Ishii et al. is too complicated for real-time usage, as it relies on complex curve fitting algorithms (e.g., Sum of Squares), which involves iteration, significant computing resources and memory, as well as the availability of a special test mode needed to exercise the complete range of the solenoid's transfer characteristic to obtain a full and complete data set. Most real-time systems can not accommodate the main controller being programmed to discontinue its control function for the purpose of executing a test program to implement the kind of calibration taught in Ishii et al. Accordingly, Ishii et al. do not effectively address the problems described above.

Accordingly, there remains a need for a system for operating a solenoid-operated valve in a pressure control system that minimizes or eliminates one or more of the shortcomings described above.

SUMMARY OF THE INVENTION

An advantage of a first aspect of the invention, in a fluid pressure control embodiment, is that it provides a control system that can accommodate in a solenoid-operated valves having an increased amount of variation, due to a dynamic learning feature that adjusts a default transfer characteristic to an actual, measured transfer characteristic. This improvement allows for a more accurate forward control signal, reducing the output error, which allows increased effectiveness of any closed loop controller. It should be understood that this aspect is not limited to a pressure control embodiment, and may be applied more generally to any device having an input-versus-output transfer characteristic, for example, a solenoid whose output is a position, a DC wheel motor whose output is a rotational speed in RPM (e.g., in the case of an electric vehicle), or a variable effort steering actuator where the actuator output would be the steering column stiffness (calculated from position and/or torque sensors).

An advantage of a second aspect, also for a fluid pressure embodiment, is that it provides a particular method for adjusting default values of control points of a solenoid's transfer characteristic to match its actual transfer characteristic. This method, however, can be used with any control system having output feedback where there is more system variation than the closed-loop feedback control system can handle. The system variation could be due to a supply limitation. For example, the system may learn of something obstructing the movement of a position actuator or there may not be enough energy available to drive the electric vehicle's wheels to the commanded speed. In any event, this method is particularly suitable for use in embedded, real-time controllers, where limited computing resources, memory and partial data may limit choice of methods.

In a pressure control embodiment (first aspect), a method is provided that is suitable for use in a pressure control system having a solenoid-operated fluid valve that has an output hydraulic pressure which varies in accordance with a solenoid input signal. The method includes a number of steps. The first step involves providing a solenoid characteristics data table including control points correlating the output pressure with the input signal wherein each control point has a default value. The next step involves acquiring a plurality of observed operating points having respective values based on observed input signal values (as provided to the solenoid) and the resulting measured output pressure values. The next step involves adjusting the control points based on the observed operating points when predetermined adjustment criteria are met. In one embodiment, the adjustment criteria are met when a predetermined minimum number of observed operating points have been acquired (or newly acquired). The final step involves generating, concurrently with the acquiring and adjusting steps, the solenoid input signal having a level that is based on the adjusted control points now stored in the solenoid characteristic data table. The adjusting step may be performed by conventional methods for matching a curve (i.e., the control points) to a measured data (i.e., the observed operating points).

However, in the second aspect, a particular method is provided for performing the adjusting step described above. The method is suitable for use in a system having a solenoid-operated fluid valve that has an output hydraulic pressure which varies in accordance with a solenoid input signal. The method of dynamically adjusting a transfer characteristic of the solenoid-operated valve includes a number of steps. The first step involves providing a data table including control points correlating the output pressure with the input signal to thereby define the transfer characteristic, wherein consecutive control points in the table define respective ranges. The next step involves acquiring observed operating points based on observed input signal levels and the resulting measured output pressure levels. The next step involves storing the observed operating points in a plurality of circular buffers, each buffer configured to store a predetermined number of observed operating points, each buffer also being associated with one of the plurality of ranges mentioned above. The next step involves adjusting the control points based on the observed operating points when predetermined adjustment criteria is met. The final step involves selectively re-aligning unadjusted control points (consistent with the original, default values for the control points). The ability to adjust control points based on observed data occurring in a limited range (i.e., as reflected by data in just one of the circular buffers) enables effective updating of the transfer characteristic with only partial data. Moreover, selectively realigning the remaining unadjusted control points produces end-to-end consistency in the transfer characteristic.

Other aspects, features and advantages are also presented.

BRIEF DESCRIPTION OF THE DRAWINGS

The invention will now be described by way of example, with reference to the accompanying drawings.

DETAILED DESCRIPTION OF THE PREFERRED EMBODIMENT

Figure 1:
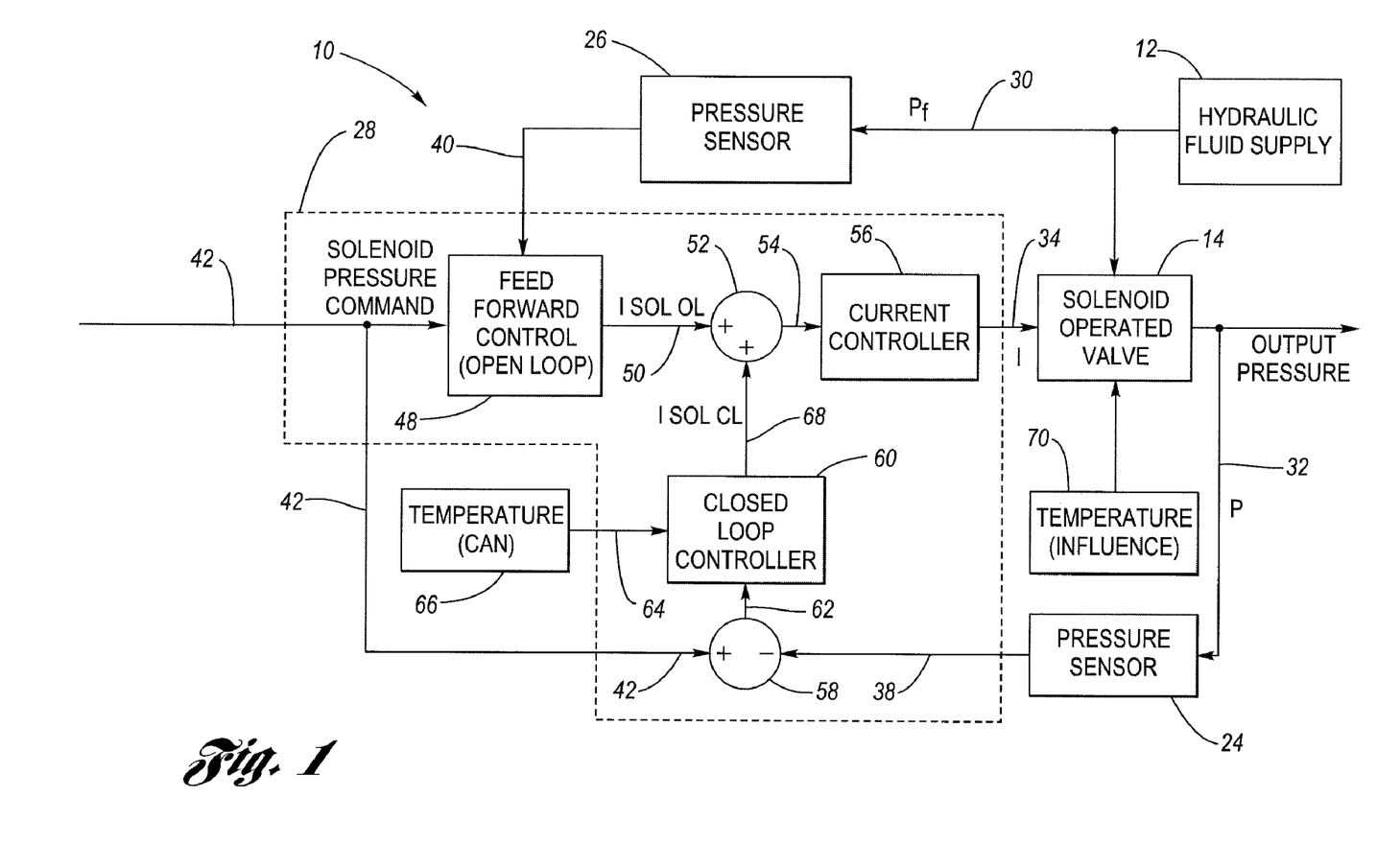
FIG. 1 is a block diagram of a pressure control system in accordance with the invention.

Referring now to the drawings wherein like reference numerals are used to identify identical components in the various views, FIG. 1 is a block diagram of an environment in which both aspects of the invention may be practiced. FIG. 1 shows a control system 10 for closed-loop hydraulic fluid pressure control. The system 10 includes a fluid supply 12 and is configured generally to control an output pressure of a solenoid-operated valve 14. While the invention will be illustrated in the context of FIG. 1, it should be understood that this is exemplary only and not limiting in nature. One of ordinary skill in the art will recognize a variety of additional or alternative useful applications of the invention. For example only, the invention may be suitable for use in controlling a clutch pressure in an automatic speed change transmission for an automotive vehicle. Additionally, more broadly, the invention may be applied to any actuator having an input-versus-output transfer characteristic. For example, the output may be a position rather than a fluid pressure. With this in mind, this description, while made in the context of a solenoid-operated valve where the output is an output fluid pressure, is exemplary only and not limiting in nature.

Figure 10:
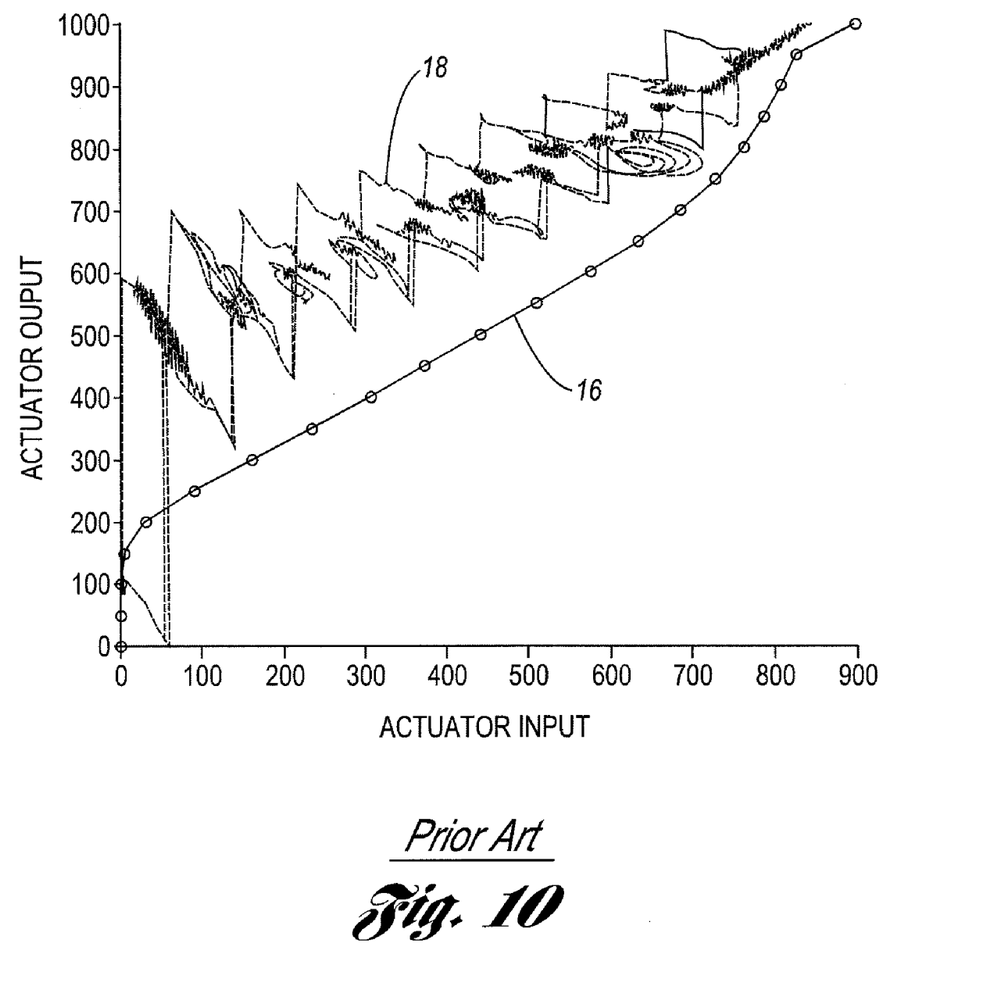
FIG. 10 is a diagram showing a variation between a nominal transfer characteristic and an actual, observed transfer characteristic.

Before proceeding to a detailed description, a general overview of the two aspects of the invention will be set forth. As described in the Background, sometimes the variation of a solenoid's actual transfer characteristic from the nominal is just too great to be effectively controlled through closed loop control. To illustrate such variation, albeit in an extreme case, FIG. 10 is a diagram showing the transfer characteristics of a sample (conventional) solenoid-operated valve. Specifically, FIG. 10 shows a nominal pressure-current (P-I) curve 16 plotted along side an actual (measured) P-I curve 18 for a sample solenoid-operated valve. As can be seen, the actual curve is offset quite significantly from the nominal curve. While normally, these variations can be addressed through the use of a closed-loop feedback control system, sometimes there is simply too much variation for a closed-loop controller to accommodate resulting in instability and/or poor performance.

The invention, in a first aspect, provides a mechanism to adjust the solenoid's pre-programmed transfer characteristic (e.g., default P-I data table) during use, based on observed operating points, so that the P-I table more closely matches that solenoid's actual transfer characteristic. This adjustment allows a feed forward control block to more accurately generate a forward or open loop solenoid control signal in the first instance so as to more closely achieve the desired output pressure from the solenoid, thereby reducing the output pressure error to levels manageable by the closed loop controller. The first aspect of the invention finds particular usefulness in cases where a system controls the input of a physical solenoid-operated valve to achieve a desired output, but the relationship between the input and output can change, perhaps significantly, due to factors such as part-to-part variation, temperature, fluid quality, supply pressure, age and wear. The invention is applicable to the control of any solenoid with a continuous one-to-one characteristic between the input and output, be it either normally high (i.e., a high or maximum output with no or low input) or normally low (i.e., no or low output with no or low input).

In a second aspect of the invention, a particular method is provided for adjusting the solenoid's pre-programmed default transfer characteristic (i.e., P-I data table). This method involves, generally speaking, feed-forward learning, which is operative to "move" the default transfer characteristic to match the observed data, allowing increased stability for the feedback controller to achieve the desired output. Many curve-fitting algorithms are known in the art that could be used to determine the optimal placement of the adjusted transfer characteristic to fit the actual data. However, these conventional algorithms have a disadvantage of requiring significant computational power in calculating cumulative errors for different possible curves until a best-fit curve is determined. Accordingly, these approaches are less preferred. The adjustment method of the second aspect finds particular advantage for embedded, real-time controllers, which do not generally have sufficient computational power or memory to run a complex curve-fitting algorithm.

Furthermore, an embedded controller does not generally have control over what outputs are commanded, so the controller may not be able to observe data points across the entire output range, which is required by most conventional "curve fitting" approaches. This adjustment approach is designed to deal with partial data, in real-world control systems that are generally not configured or permitted to enter a "Test Mode" that would be needed to perform a sweep to obtain a complete data set, because they are always controlling critical solenoids. In sum, the adjustment method in this second aspect is particularly suited for real-time systems since it does not require significant computing resources and memory as most conventional "curve fitting" algorithms do. Additionally, it does not require the main controller to go "off line" or into a "test mode" in order to obtain a full data set, as conventional curve fitting algorithms do.

Referring again to FIG. 1, the system 10 includes the fluid supply 12, the solenoid-operated valve 14, an output pressure sensor 24 configured to generate an output pressure signal 38, a feed pressure sensor 26 configured to generate a feed pressure signal 40, and a control arrangement 28 responsive to a solenoid pressure command 42 for generating a solenoid input signal 34. For each solenoid-operated valve (only one is shown), there are two control paths. These two control paths are implemented in the control arrangement 28, as shown. The first control path is the feed forward control path, and the second control path is the feedback control path. The feed forward control path, shown in block form as feed forward control (open loop) block 48, involves reference to a solenoid characteristic data table or the like, which includes control points that collectively describe the solenoid's pressure-to-current (P-I) transfer characteristic. The feed forward block generates an open loop control signal 50 ("I_SOL_CL"). The feed back control path, shown in block form as a closed loop controller 60, is responsive to an output pressure error signal 62, and generates a closed loop control signal 68 ("I_SOL_CL"). The open loop control signal 50 and the closed loop control signal 68 are combined by a summer 52 to produce an output control signal 54. The solenoid-operated valve 14 may typically be either normally-low or normally-high, and may be either current controlled or duty-cycle controlled, for example. Accordingly, a current controller 56 (and/or the configuration of the control arrangement 28 or parts thereof) may be arranged to manage these differences, making it transparent to outside control blocks. The current controller 56 is configured to translate the output control signal 54 into a solenoid input signal 34 suitable to drive the valve 14 so as to produce the desired output pressure (as directed by the solenoid pressure command 42). However, as noted elsewhere, conventional systems employ a static valued P-I curve or data table that is referenced by the feed forward block 48, which can lead to variations in the output pressure that are too great to be effectively handled by the closed loop controller 60. The invention provides a solution, which is to have the pressure control algorithm dynamically learn the P-I curve of each individual solenoid (again, only one shown), using its feedback pressure sensors and its knowledge of the commanded pressures. In an embodiment configured to be flexible enough to accommodate "normally high" and "normally low" solenoid-operated valves, the system would be initialized with two default "average" P-I data tables, one for normally high solenoids and one for normally low solenoids.

Figure 2:
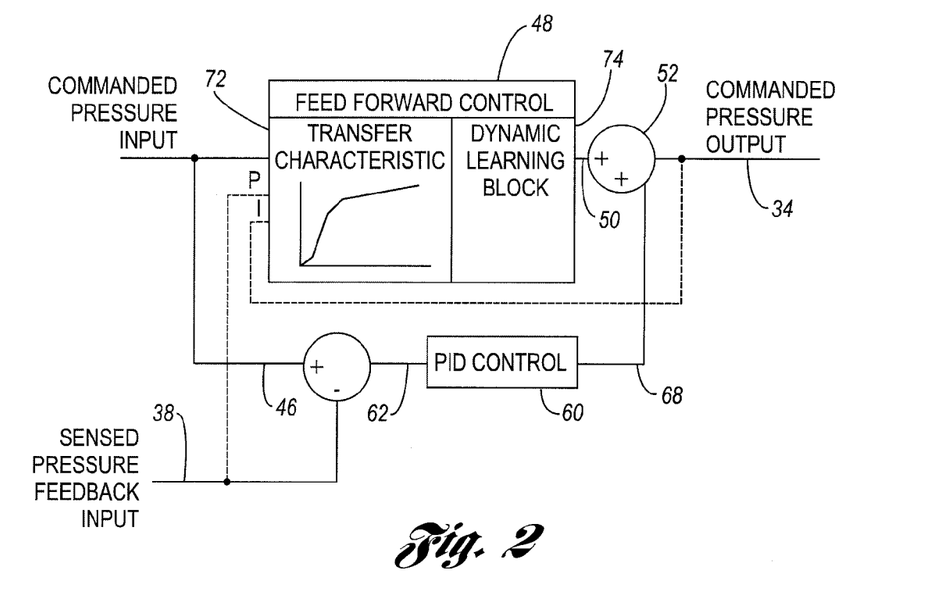
FIG. 2 is a block diagram showing, in greater detail, a feed forward block of FIG. 1 having dynamic learning of a solenoid-operated valve's transfer characteristic.

FIG. 2 is a block diagram showing an embodiment of the invention. The feed forward control block 48 has associated therewith a transfer characteristic 72, which may be a data table or other data structure. In addition, the feed forward block 48 has a dynamic learning block 74 associated therewith. The data table 72 for the solenoid-operated valve 14 includes a plurality of control points that collectively define the transfer characteristic/curve. For example, in one embodiment, each control point may include a first value for a solenoid input signal (e.g., a current, X milliamps) and a second value for an expected output pressure (e.g., Y kPa). Initially, each table 72 would include control points having predetermined, default values corresponding to a nominal transfer characteristic of the solenoid-operated valve 14. The feed forward block 48 is configured to continuously use the data table 72 (or multiple, similar tables for systems having multiple solenoids, or alternate tables for normally high or normally low) to find the appropriate solenoid input signal (current) level based on the commanded solenoid pressure. FIG. 2 also shows that the dynamic learning block 74 has access to both (i) the actual, measured output pressure ("P"), by virtue of the access to the output pressure signal 38, as well as (ii) the actual, observed solenoid input signal 34 ("I"). The dynamic learning portion 74 is configured to acquire a plurality of observed operating points based on the measured/observed data representing the physical current-to-pressure relationship. Note, that the observations of the dynamic learning block 74 will have no effect on the stored values for the control points in the data table 72 (and hence the feed forward block's output) for a given control loop. Nonetheless, the structure of FIG. 2 will allow the dynamic learning block 74 to observe the actual transfer characteristic of the solenoid-operated valve(s), regardless of the presence of any closed loop control (e.g., closed loop controller 60 in FIG. 1).

Figure 3:
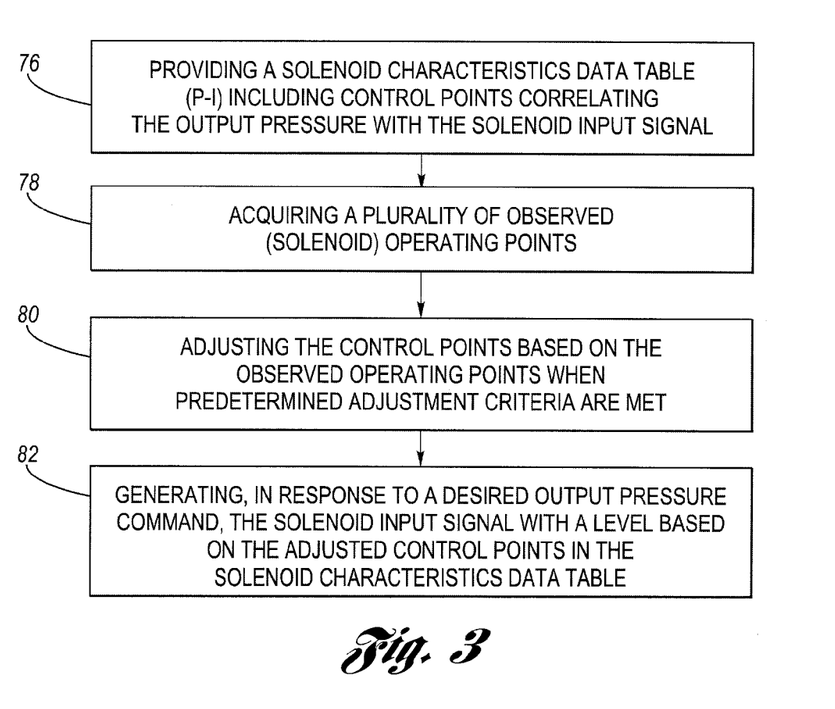
FIG. 3 is a flowchart showing a method of controlling a solenoid-operated valve using an adjusted transfer characteristic to match a measured transfer characteristic.

FIG. 3 is a flowchart of a method in accordance with a first aspect of the invention. The method begins in step 76.

Step 76 involves providing a solenoid transfer characteristics data table (e.g., P-I data table 72) that includes a plurality of control points correlating the output pressure with the solenoid input signal. Initially, the control points have default values corresponding to a nominal transfer characteristic of the solenoid-operated valve. The method proceeds to step 78.

Step 78 involves acquiring (and storing) a plurality of observed operating points reflecting the actual (measured) transfer characteristic of the solenoid-operated valve. The method proceeds to step 80.

Step 80 involves adjusting the control points (in the data table) based on the observed operating points when predetermined adjustment (trigger) criteria are met. The method then proceeds to step 82.

Step 82 involves generating, in response to the solenoid pressure command, the solenoid input signal having a level based on the adjusted control points in the solenoid data table (e.g., P-I data table 72). Preferably, the generating step is performed concurrently with the acquiring step and the adjusting step. Concurrently does not necessarily mean simultaneously; however, it is contemplated that the acquiring, adjusting and generating steps all be performed during the real-time control by the pressure control system, as distinguished from the sequential "calibration" and then "real time control" known in the art, and as described in greater detail in the Background.

As described above, the particular strategy employed for performing the control point adjustment can include known strategies for developing a best fit curve to observed data, subject to the any particular constraints (e.g., computation, memory limits) any specific application may present. For example, computation and/or memory resources may limit the range of adjustment strategies than can effectively be adopted in any particular, realized embodiment. In addition, availability or lack thereof of complete data, in certain embodiments, may also limit the range of suitable adjustment strategies. In sum, this first aspect of the invention implements a feed-forward dynamic learning of the solenoid's actual transfer characteristic, which is used to adjust the default to match the actual characteristic. This approach improves the accuracy of the solenoid input signal in the first instance, thus reducing the output error to manageable levels, even for large variations from nominal.

Figure 4:
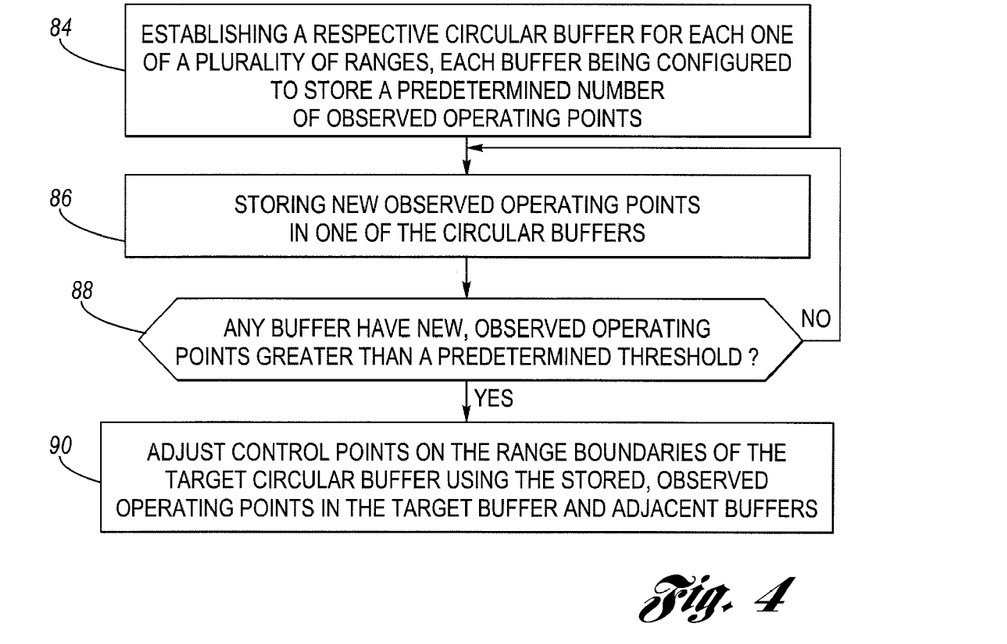
FIG. 4 is a flowchart showing, in greater detail, a method for adjusting a solenoid-operated valve's transfer characteristic based on observed operating points, suitable for use in the method shown in FIG. 3.

FIG. 4 is a flow chart showing an adjustment strategy in accordance with a second aspect of the invention. As alluded to above, this adjustment strategy is particularly suited to real-time, embedded control embodiments where computing resources and/or memory is scarce and where partial data must be assumed. The method involves a data table including control points correlating the output pressure with the input signal, which defines the transfer characteristic of the solenoid-operated valve. The method utilizes, in one embodiment, a relation where consecutive control points in the data table define a respective and distinct value range. These ranges can be taken either with respect to (i) a plurality of output pressure ranges (preferred) or (ii) a plurality of input signal levels. The method of dynamically adjusting the values of the transfer characteristic begins in step 84.

Step 84 involves establishing a respective circular buffer for each one of the plurality of ranges described above (i.e., control point to control point). Each circular buffer is configured to store a predetermined number of observed operating points. A circular buffer, in this specification, means a buffer configured to hold a fixed number of operating points, and once the "last" storage location has been filled, the next observed operating point to be stored is then stored in the "first" storage location (overwriting the previous value in the first location). The observed operating points reflect the actual transfer characteristic of the solenoid-operated valve, which may be acquired by the dynamic learning block 74 (FIG. 2) through knowledge of the solenoid input signal level as well as the resulting, measured output pressure level. Establishing a plurality of buffers deconstructs the overall range into many sub-ranges. This mechanism, as will be seen, provides a way to organize partial data. In addition, since consecutive control points are associated with a unique buffer, by virtue of the range which the control points bound, the availability of only partial data (i.e., data in one buffer) still allows adjustment of those control points. The method then proceeds to step 86.

Step 86 involves storing new, observed operating points in one of the circular buffers. Preferably, this step is performed by identifying what range the observed operating point falls into and then storing it in the identified circular buffer. "New" points mean observed operating points added to a particular circular buffer since the last time an adjustment of the control points was performed with respect to that circular buffer. The method proceeds to step 88.

In step 88, the method determines whether any one of the buffers has received more than a predetermined number of "new" observed operating points. If the answer is NO, then the method branches back to step 86 ("storing new observed operating points"). If the answer is YES, however, the method branches to step 90. Each circular buffer that exceeds the threshold is considered a target buffer for adjustment purposes. As described above, the control points in the data table 72 that bound the range associated with a target buffer are the control points to be adjusted.

Next, in step 90, the method involves adjusting the control points that bound the range of the target buffer using (i) all the observed operating points stored in the target circular buffer, not just the "new" operating points added to that buffer since the last adjustment; and (ii) all the observed operating points stored in the circular buffers that are adjacent to the target buffer. Employing circular buffers representing "ranges" of the solenoid's transfer characteristic allow adjustment of selected control points, without the need for a complete or full set of data. Finally, as will be detailed below, the non-adjusted control points are selectively realigned to produce a self-consistent transfer characteristic.

Figure 5:
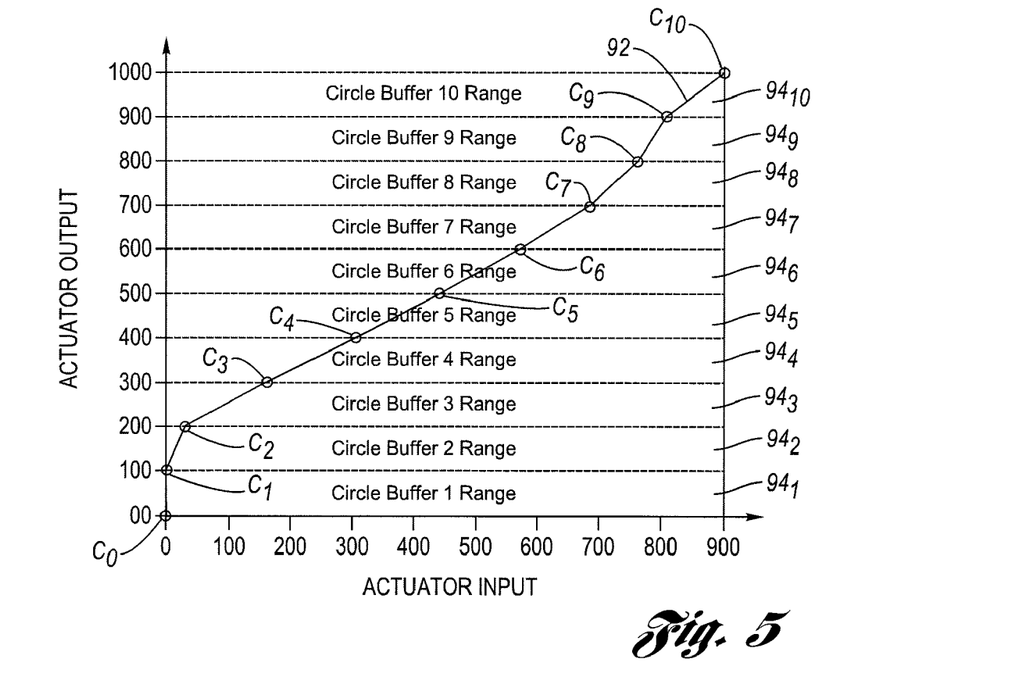
FIG. 5 is diagram showing a plurality of circular buffers used in the method of FIG. 4, over which is illustrated a plurality of control points defining the transfer characteristic.

FIG. 5 is a diagram showing, in graphical form, some of the features described above in connection with the flow chart of FIG. 4. FIG. 5 shows a diagram having the solenoid-operated valve's input signal (i.e., "Actuator Input", expressed in mA) on the X-axis and the output pressure (i.e., "Actuator Output", expressed in kPa) on the Y-axis. The plurality of discrete points stored in the data table 72, namely, the plurality of control points that define the transfer characteristic, are shown and are labeled $C_0, C_1, C_2, \ldots, C_{10}$. FIG. 5 also shows diagrammatically a plurality of circular buffers, designated $94_1, 94_2, 94_3, \ldots, 94_{10}$. In this preferred embodiment, consecutive control points define a respective range associated with each circular buffer $94_i$ where i=1 to 10. The circular buffers $94_i$ are arranged by output pressure values. Each circular buffer $94_i$ is configured to store observed operating points having an output pressure coordinate value between or in the range of the output pressure values associated with consecutive control points. In one, non-limiting embodiment, a data table 72 is provided having twenty-one (21) control points, thereby defining twenty (20) ranges to be associated with twenty corresponding circular buffers. In this non-limiting embodiment, each circular buffer is contemplated as containing fifteen (15) observed operating points. Accordingly, since there are twenty (20) ranges between the twenty-one (21) control points, and fifteen (15) operating points for each one of the buffers (ranges), a memory capable of storing 300 operating points would be required.

The dynamic learning block 74 is configured to store an observed operating point but only if (i) certain feed pressure conditions are satisfied, and (ii) it can be determined that "steady state" conditions are satisfied. The feed pressure signal is needed to determine if the measured output pressure is attenuated relative to what it should be. If it is, then the learning block 74 will disable "learning" that part of the transfer characteristic, because it will be different from what would be observed with full hydraulic fluid supply pressure. The learning block 74 can disable by not storing any of those observed operating points in the buffers. While the control system 10 may still receive a solenoid pressure command that is higher than the prevailing supply pressure, causing the output pressure to be attenuated, the system 10 will still try to get the as close to the commanded output pressure as possible. However, it still may be possible to obtain usable observations, even if the supply pressure is lower than nominal. In a preferred embodiment, a specific test requires that the observed output pressure be below the feed (supply) pressure by at least a predetermined (calibratable) amount. This ensures that the output pressure is not suffering from attenuation due to the supply pressure. If that requirement is not met, the dynamic learning block 74 will not acquire (store) any new observed operating points even when they reach steady-state, but it will continue to generate control signals to operate the solenoid based on the then-existing values for the control points in the data table. Likewise, alternate embodiments may encounter conditions comparable to the "low supply pressure" that could be used to disable the storing of observed operating points, for the same general reasons. For example, for an embodiment (actuator/motor/solenoid) where the output is a position, a high current feedback might indicate that the actuator has to apply too much force, suggesting that something might be obstructing the actuator's motion. In an electric car/DC motor embodiment, a battery voltage that is too low would be another example. In all the embodiments, even if the storing of observed operating points is disabled, the system would continue to drive the actuator input as per the control points stored in the data table.

As to the "steady state" requirement, the dynamic learning block 74 is configured to monitor sampled solenoid input signal levels and the resultant measured output pressure levels, but only store these monitored data pairs as an "observed operating point" when "steady state" conditions are met. Thus, when the solenoid input signal level and the output pressure level both remain constant (i.e., to within a predetermined amount) long enough (i.e., for a predetermined time) for transients to decay, the dynamic learning block 74 will deem the sampled data pair a steady-state observed operating point. Under these circumstances, the dynamic learning block 74 will determine into which circular buffer the new observed operating point should be stored (based on a range match), and then store the operating point in that buffer. In any constructed embodiment, the predetermined time for implementing the time filter and the maximum noise variation allowed for "Steady State" conditions to be met are preferably calibrated to the specific type of solenoid-operated valve to be controlled. It should be understood that the particular size of the data table (i.e., the number of control points), the number of circular buffers, and the number of operating points within each buffer can be adapted in size/number so as to remain within the capabilities of an embedded controller.

Figure 6:
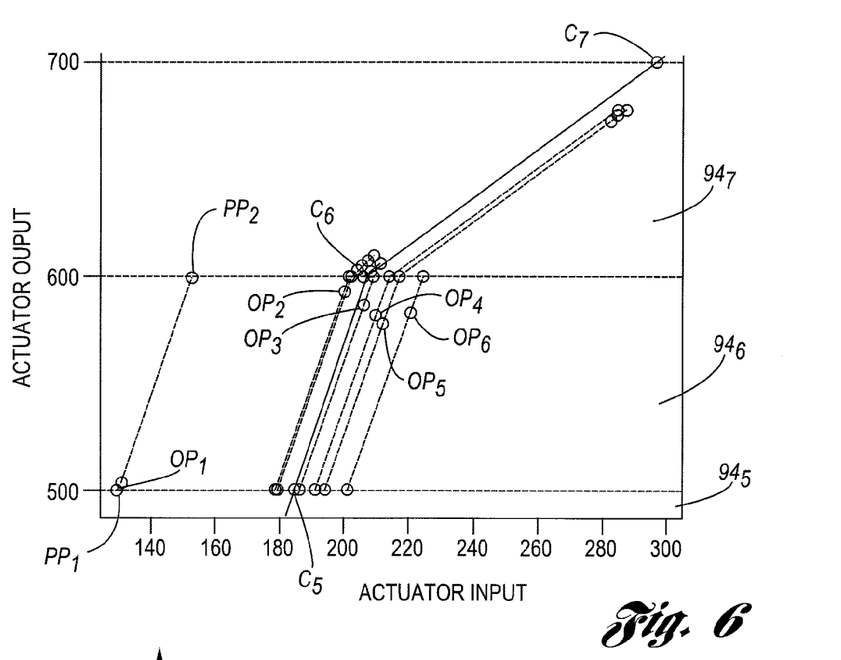
FIG. 6 is a diagram showing a plurality of observed operating points being projected to corresponding range boundaries.

FIG. 6 is a current versus pressure diagram showing in greater detail a portion of FIG. 5. In particular, FIG. 6 shows control points $C_5$, $C_6$ and $C_7$ spanning circular buffers $94_5$, $94_6$ and $94_7$. FIG. 6 also shows a plurality of observed operating points, those stored in circular buffer $94_6$ that are illustrated being designated $OP_1$, $OP_2$, $OP_3$, $OP_4$, $OP_5$ and $OP_6$.

The dynamic learning block 74 is configured to selectively update certain control points stored in the data table 72 when predetermined adjustment criteria are met. In a preferred embodiment, the predetermined adjustment criteria are met whenever a predetermined number of "new" observed operating points are stored in the range of any one of the circular buffers. In one embodiment (where the buffers store (15) operating points), the predetermined trigger number is six (6) new operating points. However, the particular predetermined number may comprise a calibration that can be modified on a per-system basis. In one embodiment, a counter or the like may be associated with each one of the circular buffers $94_i$, and which is initially reset. As the observed operating points are stored by the dynamic learning block 74, the plurality of counters are separately incremented in accordance with the number of further, new observed operating points stored in the respective buffer. When any one of the counters (or like mechanism) reaches the threshold, a trigger is generated, which satisfies the predetermined adjustment criteria. In a preferred embodiment, an adjustment affects only two (adjacent) control points, which are on each side of the range associated with the target buffer (i.e., the target buffer is the buffer whose counter generated the trigger). After the dynamic learning block 74 completes the adjusting step (more below), the counter for that target buffer is reset, and counting begins anew as further, new observed operating points are stored in that buffer.

With continued reference to FIG. 6, preferably, for simplification purposes, the control points $C_i$ are held constant on one axis. In the illustrated embodiment, the Y-axis representing output pressure values are held constant. The control points are thus only adjusted either to the right (i.e., increasing the input level coordinate) or to the left (i.e., decreasing the input level coordinate). For example, control point $C_5$ will have X-Y coordinates of (X, 500) where X can vary, but the Y-axis coordinate will be constant at 500 kPa. In alternate embodiments, the solenoid input signal (e.g., current) values could be held constant, resulting in the control points being adjusted "up" or "down". In either embodiment, a constant axis allows the value ranges covered by the associated circular buffers to be remain the same throughout operation.

For purposes of description, the target buffer is the circular buffer $94_6$, and the control points being adjusted are control points $C_5$ and $C_6$. The dynamic learning block 74 will adjust each of the control points $C_5$ and $C_6$ separately either to the left or to the right of where they are illustrated, without changing any of the observed operating points that are stored in the circular buffer $94_6$. This behavior allows the overall transfer characteristic, defined by the control points, to also move as necessary. For example, if any part of the transfer characteristic needs to be moved "down", the same result can be achieved by moving the topmost control point in FIG. 6, along with control points below it, to the "right".

It should be understood that the observed operating points used in the adjusting step can (and will) include those falling anywhere in the range associated with that circular buffer, not just those operating points that happen to lie on the horizontal lines. That being said, the dynamic learning block 74 will need to identify new control points that will remain on the respective "500" and "600" horizontal lines. As described above, conventional curve-fitting algorithms can be too complex for an embedded controller, so rather than analyze the post-adjustment line for how well it matches the observed operating points, the adjusting step involves projecting the observed operating points to the horizontal lines that define the range boundaries of the circular buffer. This may be visualized as striking a line through each observed operating point parallel to (i.e., having the same slope as) an imaginary line between the unadjusted control points. Through this projection step, the resultant projected points all have the same constant-axis coordinate value, thereby simplifying the later step of processing the variable-axis coordinate. For example, all the projected points on the "500" horizontal lie are in the form of ($X_i$, 500), where $X_i$ is a variable value depending on where the projected line intersects the horizontal (constant axis) line.

Example. The unadjusted control points $C_5$ and $C_6$ define a first slope therebetween (e.g., slope=rise/run). In FIG. 6, all of the observed operating points stored in the circular buffer $94_6$, i.e., all the observed operating points between 500 and 600, shown as points $OP_1$, $OP_2$, $OP_3$, $OP_4$, $OP_5$ and $OP_6$, are projected to their respective range boundaries, namely, to the "500" and "600" level horizontal lines. This projection comprises an imaginary line, having the first slope and which includes the observed operating point being projected. It is a routine matter to calculate where such an imaginary line will intersect the horizontal "500" and "600" level lines. The intersection points may be referred to as projected points. As one example, the line through the observed operating point $OP_1$ will intersect the "500" level horizontal line at a first projected point $PP_1$ ($X_1$, 500) and will intersect the "600" level horizontal line at a second projected point $PP_2$ ($X_2$, 600). This is repeated for all the observed operating points in the target circular buffer $94_6$. Likewise, the observed operating points above the "600" level horizontal line are also projected, but along a second slope. The second slope corresponds to the slope between control points $C_6$ and $C_7$. It warrants emphasizing that each control point can be adjusted based on all the observed operating point data available, not only those points in the target circular buffer, but also in either or both of the adjacent circular buffers, even though the target buffer triggered the adjustment.

Projecting the plurality of observed operating points according to the local slope of the non-adjusted control points results in a corresponding plurality of positions to which that control point could be moved. The projection approach described above assumes that the transfer characteristic is substantially linear over the region (i.e., range) being projected. The closer the observed operating point is to the control point, the less error there will be in this assumption.

To address these inaccuracies and determine the best possible value for the new, adjusted control point, the invention weights (i.e., determines a weighting factor for) each of the projected points based on how close its associated observed operating point is from the control point being adjusted, using a simple ratio. For example, assume that observed operating point $OP_6$ in FIG. 6 has a Y-axis coordinate of 580 which is between the $C_5$ control point at a Y-axis coordinate of 500 and the $C_6$ control point at a Y-axis coordinate of 600. When the adjustment of the $C_6$ control point is considered, the projected point on the "600" level horizontal line (based on the projected line through $OP_6$) will be weighted at 80/100 or 80%. When the adjustment of the $C_5$ control point is considered, the projected point through $OP_6$ on the "500" level horizontal line, based on the projected line through $OP_6$, will be weighted at 20/100 or 20%.

Once the respective weighting factors are determined, the method then determines the new values to adjust the control points. The method determines the weighted average of the projected points appearing on each horizontal, constant-axis, line. The method involves multiplying each projected point by its weighting factors to produce a plurality of products. Then, adding the plurality of products together to produce a sum of products. Then, adding the plurality of weighting factors together to produce a sum of weights. Finally, dividing the sum of products by the sum of weights. This parameter value represents the new coordinate on the non-constant axis, with the other coordinate being the value for the constant axis. For example, where the output pressure is the constant axis, the parameter calculated above is the adjusted input signal level (e.g., current level), which together form a new, adjusted control point, which may be offset from the original control point for that pressure level. The method may also involve a check before adjusting a control point, to determine whether a minimum combined weight (of the observed operating points) has met a predetermined minimum calibration amount. If the observed operating points are all too far away (from the control points to be adjusted) to accrue enough weight to reach the predetermined minimum, then the control point is not adjusted.

Hysteretic Systems. For solenoids with a large degree of hysteresis, the dynamic learning block 74 is further configured to perform a special adjustment of the control points, with a bias towards re-adjustment to the center of the hysteresis. To accomplish this special adjustment, the dynamic learning block 74 is further configured to classify the observed operating points as "rising," "falling," or "indeterminate", which constitutes a directional reference. The dynamic learning block 74 is configured to make this classification based on an assessment of the movement of the solenoid pressure command. If the pressure command moves by a predetermined amount in just one direction, then any subsequent points observed while the pressure command continues to move in that direction are classified as "rising" or "falling", matching the direction of the solenoid pressure command. Otherwise, observed operating points are classified as "indeterminate". To accommodate this feature, the observed operating points stored in the circular buffers each include not only X and Y axis coordinate values, but additional information reflecting the directional classification (i.e., "rising", "falling" or "indeterminate").

In this embodiment, the dynamic learning block 74 is configured differently when weighting the projected points for a control point adjustment. In particular, the dynamic learning block 74 is configured to perform a check to see if there are enough determinant points, in either or both directions, to calculate a statistical variance. A calibration is used to specify how many observed operating points are necessary to satisfy this requirement. If there are enough points, then the block 74 calculates a weighted average and a weighted variance of just those projected points. For "rising" points, the block 74 then adds the variance to the computed average, while for "falling" points, the block 74 subtracts the variance from the computed average. The resulting, consolidated number is then used in place of these consolidated points, along with the sum of these points' weights, in the overall weighted average calculation (as described above). By using the "rising" or "falling" commanded output pressure as the criteria, this hysteresis feature will work for either normally-rising or normally-falling solenoid characteristics.

As an enhancement, the dynamic learning block 74 is further configured to look for the specific case where both variances can be calculated. If so, and the "falling" point average minus its variance is greater than the "rising" point average plus its variance, then the dynamic learning block 74 will determine this to be a "stable" control point adjustment.

In a still further variation, the dynamic learning block 74 may be configured to ignore indeterminate observed operating points (and just use either the "rising" or "falling" points). It has been noted that under some circumstances, the control points "bounce" back and forth within the hysteresis band, based on how many "rising" points versus "falling" points it sees in its range. To prevent this and provide for stable adjustments, the block 74 may be configured to ignore any indeterminate points, and the relative weights of the rising and falling points, and to simply adjust to the non-weighted midpoint between the levels indicated by the two variances (see FIG. 8). This allows the feed forward block 48 to find a more stable transfer characteristic in the middle of the hysteresis, so that the feedback controller 60 can compensate more readily for the hysteresis in either direction.

Figure 7:
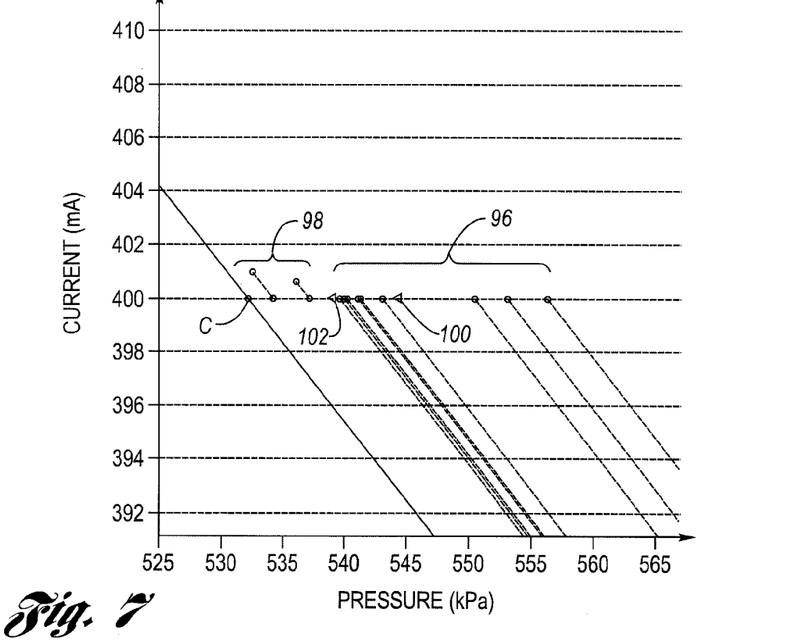
FIG. 7 is a pressure versus current diagram showing observed operating points, classified as either "rising" and "falling" for systems exhibiting hysteresis.

FIG. 7 is a diagram showing output pressure versus input current for a solenoid-operated valve. Note, in FIG. 7, the solenoid input signal (current) is the "constant axis," not output pressure as illustrated previously. Additionally, the control point C to be adjusted will move "left" or "right" along the 400 mA level horizontal line. The plurality of projected points designated by reference numeral 96 correspond to projections from "falling" observed operating points, which are out of the frame (not shown). The two projected points designated by reference numeral 98 correspond to the pair of "rising" observed operating points. For description purposes, assume that the dynamic learning block 74 is configured to require no less than four "rising" or "falling" observed operating points to perform the statistics and the consolidation of "rising" and/or "falling" points function as described above. In this case (FIG. 7), there are not enough "rising" points to calculate the required statistics; however, there are enough "falling" points. FIG. 7 shows two arrows 100 and 102 representing the results of such calculations. The arrow 100 represents the weighted average of the "falling" points, as projected onto the 400 mA level horizontal line. The arrow 102 is the weighted average of the "falling" points minus the weighted variance of these points.

To calculate the adjusted "400 mA" level control point C, the dynamic learning block 74 uses the coordinate values of the leftmost arrow 102 as if it were a single projected point having the combined weight of all of the "falling" points. This point is used in place of all of the "falling" points. The dynamic learning block 74 then calculates the weighted average of this point (i.e., at the arrow 102) along with the two "rising" projected points to determine the new output pressure for the "400 mA" level control point C.

Figure 8:
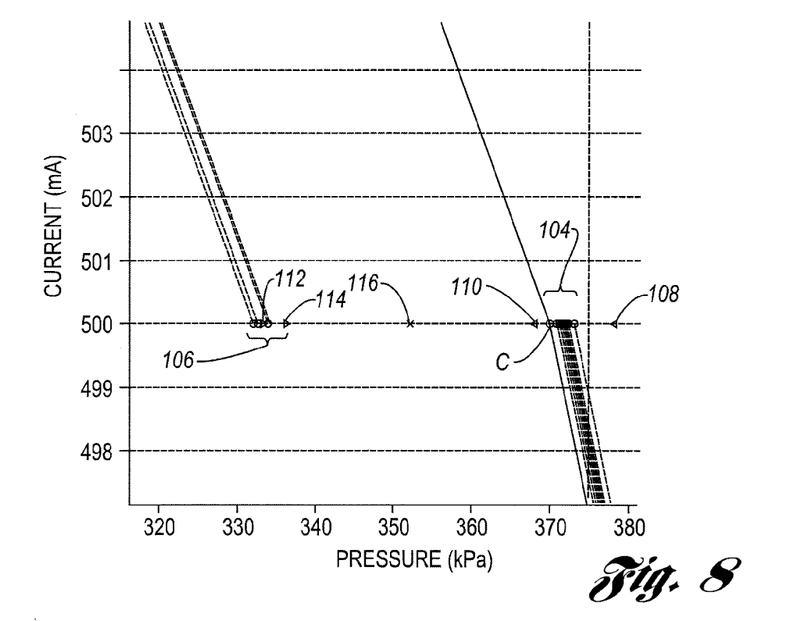
FIG. 8 is a pressure versus current diagram illustrating a non-weighted average approach.

FIG. 8 is a diagram showing output pressure versus input current for a solenoid-operated valve, but showing a stable transition (hysteresis situation). Again, the solenoid input signal (current) is the "constant axis," and the control point to be adjusted is labeled control point C. The plurality of projected points, designated by reference numeral 104, corresponds to projections from "falling" observed operating points, which are out of frame (not shown). The plurality of projected points, designated by reference numeral 106, corresponds to the projections from "rising" observed operating points, also out of the frame (not shown). A pair of arrows 108 and 110 represents the results of consolidating the plurality of "falling" points into a single point. The arrow 108 represents the weighted average of all of the "falling" points, including some whose projected points are out of frame to the right. The arrow 110 is the weighted average of all of the "falling" points minus the weighted variance of the "falling" points, just like in the previous example. Likewise, a pair of arrows 112 and 114 represents the results of consolidating the "rising" points. The arrow 112 is the weighted average and the arrow 114 is the weighted average plus the weighted variance of the "rising" points.

The dynamic learning block 74 is configured, in one embodiment, to adjust the control point C to the weighted average of the arrows 110 and 114, corresponding to the two "weighted average plus/minus weighted variance" points. But note that the resultant point would be much closer to the "Falling" points, because they have a greater combined weight, by virtue of the fact that there are more of them. This is not because of any physical aspect of the solenoid, but just because of how many points in each direction happen to be in the circular buffer at the adjustment time.

Accordingly, the dynamic learning block 74 is configured, in a preferred embodiment, to adjust the control point C to the non-weighted, rather than the weighted, average (i.e., in other words, the midpoint) of the two "Average plus/minus variance" points. This resultant point is shown as point 116 in FIG. 8. In this preferred embodiment, the adjusted control point remains stable for future adjustments, regardless of the relative mix of "Rising" versus "Falling" points.

Figure 9:
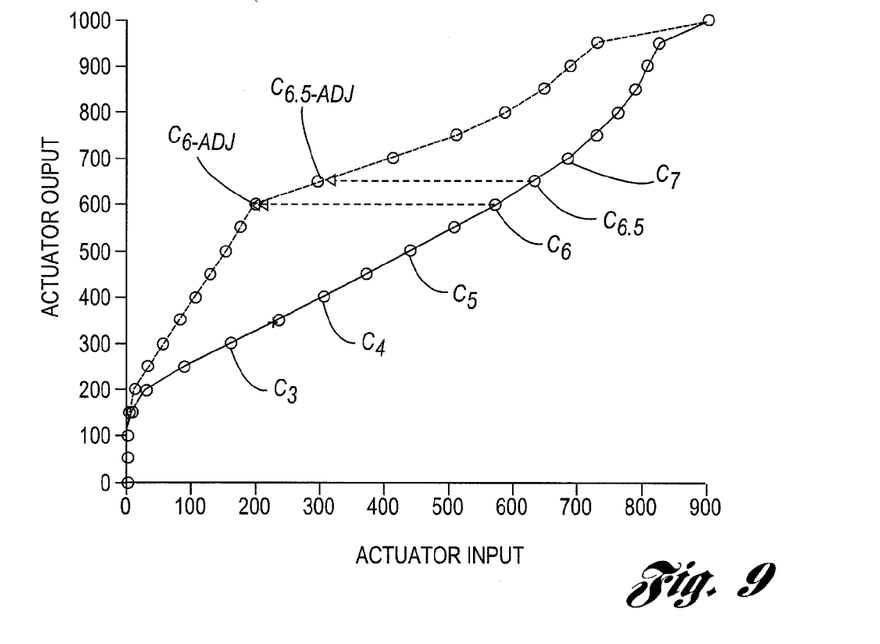
FIG. 9 is a diagram showing a selective realignment feature.

FIG. 9 is a solenoid input signal (current) versus output pressure diagram showing a realignment feature of the invention. The methods described above dynamically adjust the control points so as to converge to the actual (measured) transfer characteristic. The methods are effective to automatically adjust to gradual changes to the transfer characteristic over time. In addition, the methods of the invention have particular usefulness where only partial measured data is available. As described above, this may be due to the fact that an embedded controller would not have control over what solenoid pressure commands it receives. Additionally, such an embedded controller needs to work in safety critical real-time applications where it is not allowed to go into a "Test" or "Learning" mode, so there may be some ranges for which pressure commands are simply never received. To further complicate the scenario, some ranges may be commanded at certain times, but not for long enough time to acquire an observed operating point (i.e., steady-state), or not frequently enough to adjust any of the control points. A control system may nevertheless require that accurate solenoid input control signals being generated during the few times in which these output pressure levels are commanded.

Accordingly, the dynamic learning block 74 is still further configured to keep track of which control points have been adjusted away from their default values, e.g., since a most recent memory table reset. After each initial control point adjustment, the dynamic learning block 74 loops through and examines/processes all the control points in the table 72. Other than the two endpoints, if any control point or group of consecutive control points has not been directly adjusted by block 74 (as opposed to just being re-aligned), they are then realigned based on the nearest endpoint or other control point that has been adjusted. This realignment process preserves the relative proportions among this set of control points from the original default transfer characteristic. For example, a ratio between the values for adjusted and non-adjusted control points can be calculated, and then used to scale the non-adjusted control points so as to maintain the relative proportions of the original (default) transfer characteristic. Through the foregoing, as long as the shape of the actual transfer characteristic is geometrically similar to the default, the initial control point(s) to be adjusted should compensate for most of the offset errors over the entire data table and give a reasonably good approximation of the solenoid's actual transfer characteristic. In FIG. 9, the control points $C_6$ and $C_{6.5}$ have undergone an initial adjustment based on observed data. The adjusted control points are indicated at $C_{6\text{-}ADJ}$ and $C_{6.5\text{-}ADJ}$. The remaining control points, some of which are shown (e.g., $C_3$, $C_4$, $C_5$, $C_7$, etc.) in the Figure, are now realigned in the manner described above, and are thus shifted, as shown in exemplary fashion in FIG. 9.

Referring again to FIG. 1, to ensure a complete description, additional details regarding the exemplary configuration of system 10 will now be set forth. System 10 includes a hydraulic fluid supply 12, a solenoid-operated valve 14, sometimes alternatively referred to as an actuator or simply solenoid, an output pressure sensor 24, an feed or supply fluid pressure sensor 26 and a control arrangement 28. The hydraulic fluid supply 12 includes an outlet that supplies hydraulic fluid through line 30 to the solenoid-operated valve 14, and the pressure sensor 26. The fluid supply 12 may comprise conventional components known to those of ordinary skill in the art, for example, pumps, pressure regulating devices, valves and the like. The fluid supply 12 provides hydraulic fluid at a nominal feed pressure ($P_f$) in accordance with the design requirements of any particular constructed embodiment.

The valve 14 includes (i) an inlet to receive the supply of hydraulic fluid at the feed pressure ($P_f$) via line 30 as well as (ii) an outlet coupled to a line 32. The valve 14 is configured to provide hydraulic fluid at an output pressure (P) that is variable in accordance with a solenoid input (drive) signal 34. The valve 14 may comprise conventional components known to those of ordinary skill in the art. In one embodiment, the valve 14 may comprise a pressure control solenoid (e.g., a variable bleed solenoid, or variable flow solenoid), a current controlled device that produces an output pressure as a function of an applied current (i.e., via input signal 34). In an alternate embodiment, the valve 14 may comprise a pulse-width modulated (PWM) actuator that produces an output pressure corresponding to the duty cycle of an input drive signal. It should be understood that the invention is not limited to these two embodiments, which are merely exemplary and not limiting in nature.

The pressure sensor 24 is in fluid communication with line 32 and is configured to sense the output pressure (P) and generate a pressure signal 38 indicative of the sensed or measured pressure level. The sensor 24 may comprise conventional components known in the art.

The feed pressure sensor 26 is in fluid communication with supply line 30 and is configured to sense the feed pressure ($P_F$) and generate a feed pressure signal 40 indicative of the sensed feed pressure level. The sensor 26 may comprise conventional components known in the art. In an alternate embodiment, the feed pressure sensor 26 is omitted and is substituted with conventional means for estimating a feed pressure level.

The control arrangement 28 is configured to generate the solenoid input signal 34 in response to at least (i) a solenoid pressure command signal 42 indicative of a desired output pressure and (ii) a pressure signal 38 (as a feedback signal) indicative of the sensed pilot pressure.

The control arrangement 28 further includes a feed forward control block 48 producing an open loop control signal 50, a summer 52 producing an output valve control signal 54, a current controller block 56, another summer 58 and a closed loop controller 60.

The feed forward control block 48 is configured to perform the functions described above and is responsive to solenoid pressure command signal 42 and feed pressure signal 40 for generating the open loop control signal 50. In the illustrated embodiment, the control signal 50 is shown as i_sol_OL, which is applicable when the solenoid-operated valve 14 is implemented using a current controlled valve, as described above. It should be understood, however, that the feed forward block 48 is not so limited, and may be configured to generate the control signal 50 applicable for a PWM duty cycle controlled valve, also as described above.

The block 56 is configured generally to convert or translate the output control signal 54 to the solenoid input (drive) signal 34. In an embodiment where the solenoid-operated valve is current controlled, the block may take the form of a current controller. In an alternate embodiment where the valve 14 comprises a PWM duty cycle controlled valve, the block 56 may comprise a PWM duty cycle controller. The block 56 outputs the solenoid input signal 34, which is applied to the valve 14 causing it to output hydraulic fluid at the desired pressure. It should be appreciated that temperature can also influence the operation and performance of the valve 14—this temperature influence is shown in block form and is designated 70. The measured output hydraulic pressure (P) is then fed back via the pressure sensor 24.

The summer 58 is configured to provide the means for generating a pressure error signal 62 indicative of a difference between the commanded and sensed solenoid output pressures. In this regard, the summer 58 is responsive to the solenoid pressure command signal 42 and the pressure signal 38 (at the inverting input) in generating the error signal 62.

The closed loop controller 60 is responsive to the generated error signal 62 and a temperature signal 64 produced by a temperature sensor 66 or other available source of temperature data to generate a closed loop control signal 68. The temperature signal 64 via temperature sensor 66 is typically available in automotive applications via a Controller Area Network (CAN), for example.

The summer 52 is configured to sum and generate the output control signal 54 based on and responsive to (i) the solenoid open loop control signal 50 and (ii) the closed loop solenoid control signal 68. The output solenoid control signal 54 is provided to the current controller block 56.

It should be understood that the feed forward block 48, the closed loop controller 60 the and summers 52, 58 may be configured to interact and cooperate with each other all in accordance with conventional control principles to generate the output control signal 54. For example, the foregoing components may implement proportional integral (PI) control, proportional integral derivative (PID) and any other suitable, conventional control strategy. Other variations are possible in accordance with that known to one of ordinary skill.

It should be understood that the feed forward control block, the closed loop controller and the dynamic learning block as described above may include conventional processing apparatus known in the art, capable of executing pre-programmed instructions stored in an associated memory, all performing in accordance with the functionality described herein. In one embodiment, all may be implemented in the same embedded controller. It is contemplated that the processes described herein will be programmed in a preferred embodiment, with the resulting software code being stored in the associated memory. Accordingly, the means for acquiring a plurality of observed operating points, the means for adjusting the control points and the means for generating the solenoid input signal all correspond to a processing apparatus programmed to perform the functions described herein. Implementation of the invention, in software, in view of the foregoing enabling description, would require no more than routine application of programming skills by one of ordinary skill in the art. Such an embedded controller may further be of the type having both ROM, RAM, a combination of non-volatile and volatile (modifiable) memory so that the software can be stored and yet allow storage and processing of dynamically produced data and/or signals.

While particular embodiments of the invention have been shown and described, numerous variations and alternate embodiments will occur to those skilled in the art. Accordingly, it is intended that the invention be limited only in terms of the appended claims.

The invention claimed is:

1. In a system having a solenoid-operated fluid valve that has an output hydraulic pressure which varies in accordance with a solenoid input signal, a method of dynamically adjusting a transfer characteristic of the solenoid-operated valve, comprising the steps of:
providing a data table including control points correlating the output pressure with the input signal to thereby define the transfer characteristic, consecutive control points in the table defining a respective one of a plurality of ranges;
acquiring observed operating points based on observed input signal levels and resulting measured output pressure levels;
storing the observed operating points in a plurality of circular buffers, each buffer configured to store a predetermined number of observed operating points, each buffer being associated with one of the plurality of ranges;
adjusting selected control points based on the observed operating points when predetermined adjustment criteria is met; and
selectively realigning unadjusted control points.

2. The method of claim 1 wherein said providing step includes the sub-step of defining default values for the control points corresponding to a nominal output pressure-versus-input signal transfer characteristic.

3. The method of claim 1 wherein said the plurality of ranges are configured as one of (i) a plurality of output pressure ranges collectively spanning the overall output pressure variation of the solenoid-operated valve; and (ii) a plurality of input signal ranges collectively spanning the overall input signal variation of the solenoid-operated valve.

4. The method of claim 1 wherein said acquiring step includes the sub-step of sampling monitored solenoid input signal and measured solenoid output pressure levels when predetermined steady-state conditions are met to thereby define a respective one of the observed operating points.

5. The method of claim 4 wherein the predetermined steady-state conditions comprise time-based filtering and noise-limited filtering.

6. The method of claim 1 wherein said storing step includes the sub-step of:
selecting, for each observed operating point, one of the circular buffers into whose range the observed operating point falls; and
storing each observed operating point into the respective, selected circular buffer.

7. The method of claim 1 further including the steps of:
establishing a counter for each circular buffer, each counter being initially reset;
incrementing each counter in accordance with observed operating points stored in the respectively associated circular buffer;
generating a trigger for one of the buffers whose counter reaches a predetermined threshold, the trigger satisfying the predetermined adjustment criteria;
wherein said method further including the step of:
after said adjusting step, resetting the counter that generated the trigger.

8. The method of claim 6 wherein the circular buffer associated with the trigger is a target buffer, said adjusting step being performed as a function of the observed operating points stored in the target buffer and the observed operating points stored in circular buffers that are adjacent to the target buffer.

9. The method of claim 8 wherein said adjusting step includes the sub-steps of:
selecting first and second control points from the data table that lie on first and second boundaries of the range associated with the target buffer;
projecting the observed operating points stored in the target buffer and adjacent circular buffers to one of the first and second boundaries to form corresponding projected points;
generating a first parameter by weighting projected points on the first boundary as a function of the proximity of the corresponding observed operating point to the first boundary;
generating a second parameter by weighting projected points on the second boundary as a function of the proximity of the corresponding observed operating point to the second boundary;
calculating offsets to the first and second control points based respectively on the first and second parameters.

10. The method of claim 9 wherein said projecting step includes the sub-step of:
determining a first slope between the first and second control points;
determining, for the observed operating points stored in the target buffer, coordinates of projected points on the first and second boundaries in accordance with the first slope.

11. The method of claim 9 wherein said step of generating the first parameter includes the sub-steps of:
determining, for each projected point on the first boundary, a respective weighting factor as a function of the proximity of the corresponding observed operating point to the first boundary;
multiplying each projected point on the first boundary by a respective one of the determined weighting factors to produce a plurality of products;
adding the plurality of products to form a sum of products;
adding the plurality of weighting factors to form a sum of weights;
dividing the sum of products by the sum of weights to produce the first parameter.

12. The method of claim 9 wherein said step of acquiring observed operating points includes the sub-step of determining for each observed operating point a respective directional reference based on changes in a solenoid pressure command indicative of a desired output pressure, said directional reference being selected from the group comprising rising pressure, falling pressure and indeterminate.

13. The method of claim 12 wherein said step of generating the first parameter is performed by the sub-steps of:
determining a first set of observed operating points that are stored in the target and adjacent buffers and that have the rising pressure directional reference and whose associated projected points lie on the first boundary;
determining a first number indicative of the number of operating points in the first set;
consolidating projected points on the first boundary associated with operating points in the first set into a single rising point when the first number exceeds a first predetermined minimum number.

14. The method of claim 13 wherein said step of generating the first parameter is performed by the sub-steps of:
determining a second set of observed operating points that are stored in the target and adjacent buffers and that have the falling pressure directional reference and whose associated projected points lie on the first boundary;
determining a second number indicative of the number of operating points in the second set;
consolidating projected points on the first boundary associated with operating points in the second set into a single falling point when the first number exceeds a second predetermined minimum number.

15. The method of claim 14 wherein said step of generating the first parameter includes the sub-steps of:
determining a non-weighted average of the single rising point and single falling point.

16. The method of claim 13 wherein said rising point consolidating step includes the sub-steps of:
calculating a weighted average of the projected points associated with operating points in the first set wherein the single rising point has a weighting factor corresponding to the sum of the weighting factors of the consolidated projected points; and
determining a weighted variance of the projected points associated with operating points in the first set;
adding the weighting variance to the weighted average associated with the single rising point.

17. The method of claim 13 wherein said falling point consolidating step includes the sub-steps of:
calculating a weighted average of the projected points associated with operating points in the second set wherein the single falling point has a weighting factor corresponding to the sum of the weighting factors of the consolidated projected points;
determining a weighted variance of the projected points associated with operating points in the second set;
subtracting the weighting variance from the weighted average associated with the single falling point.

18. The method of claim 1 wherein said step of selectively realigning the unadjusted control points includes the sub-step of:
determining a ratio between adjusted and unadjusted values of the control point; and
scaling unadjusted control points using the ratio.

19. In a system having an actuator that has an output which varies in accordance with an actuator input signal, a method of dynamically adjusting a transfer characteristic of the actuator, comprising the steps of:
providing a data table including control points correlating the output with the actuator input signal to thereby define the transfer characteristic, consecutive control points in the table defining a respective one of a plurality of ranges;
acquiring observed operating points based on observed actuator input signal levels and resulting measured output levels;
storing the observed operating points in a plurality of circular buffers, each buffer configured to store a predetermined number of observed operating points, each buffer being associated with one of the plurality of ranges;
adjusting selected control points based on the observed operating points when predetermined adjustment criteria is met; and
selectively realigning unadjusted control points.

20. The method of claim 19 wherein said acquiring step includes the sub-step of sampling monitored actuator input signal and measured actuator output levels when predetermined steady-state conditions are met to thereby define a respective one of the observed operating points.

21. The method of claim 19 wherein said storing step includes the sub-step of:
selecting, for each observed operating point, one of the circular buffers into whose range the observed operating point falls; and
storing each observed operating point into the respective, selected circular buffer.

22. The method of claim 19 further including the steps of:
establishing a counter for each circular buffer, each counter being initially reset;
incrementing each counter in accordance with observed operating points stored in the respectively associated circular buffer;
generating a trigger for one of the buffers whose counter reaches a predetermined threshold, the trigger satisfying the predetermined adjustment criteria;
wherein said method further including the step of:
after said adjusting step, resetting the counter that generated the trigger.

23. The method of claim 21 wherein the circular buffer associated with the trigger is a target buffer, said adjusting step being performed as a function of the observed operating points stored in the target buffer and the observed operating points stored in circular buffers that are adjacent to the target buffer.

24. The method of claim 23 wherein said adjusting step includes the sub-steps of:
selecting first and second control points from the data table that lie on first and second boundaries of the range associated with the target buffer;
projecting the observed operating points stored in the target buffer and adjacent circular buffers to one of the first and second boundaries to form corresponding projected points;
generating a first parameter by weighting projected points on the first boundary as a function of the proximity of the corresponding observed operating point to the first boundary;
generating a second parameter by weighting projected points on the second boundary as a function of the proximity of the corresponding observed operating point to the second boundary;
calculating offsets to the first and second control points based respectively on the first and second parameters.

25. The method of claim 24 wherein said projecting step includes the sub-step of:
determining a first slope between the first and second control points;
determining, for the observed operating points stored in the target buffer, coordinates of projected points on the first and second boundaries in accordance with the first slope.

26. The method of claim 24 wherein said step of generating the first parameter includes the sub-steps of:
determining, for each projected point on the first boundary, a respective weighting factor as a function of the proximity of the corresponding observed operating point to the first boundary;
multiplying each projected point on the first boundary by a respective one of the determined weighting factors to produce a plurality of products;
adding the plurality of products to form a sum of products;
adding the plurality of weighting factors to form a sum of weights;
dividing the sum of products by the sum of weights to produce the first parameter.

27. The method of claim 24 wherein said step of acquiring observed operating points includes the sub-step of determining for each observed operating point a respective directional reference based on changes in an actuator output command indicative of a desired output, said directional reference being selected from the group comprising a rising output, a falling output and indeterminate.

28. The method of claim 27 wherein said step of generating the first parameter is performed by the sub-steps of:
   determining a first set of observed operating points that are stored in the target and adjacent buffers and that have the rising output directional reference and whose associated projected points lie on the first boundary;
   determining a first number indicative of the number of operating points in the first set;
   consolidating projected points on the first boundary associated with operating points in the first set into a single rising point when the first number exceeds a first predetermined minimum number.

29. The method of claim 28 wherein said step of generating the first parameter is performed by the sub-steps of:
   determining a second set of observed operating points that are stored in the target and adjacent buffers and that have the falling output directional reference and whose associated projected points lie on the first boundary;
   determining a second number indicative of the number of operating points in the second set;
   consolidating projected points on the first boundary associated with operating points in the second set into a single falling point when the first number exceeds a second predetermined minimum number.

30. The method of claim 29 wherein said step of generating the first parameter includes the sub-steps of:
   determining a non-weighted average of the single rising point and single falling point.

31. The method of claim 28 wherein said rising point consolidating step includes the sub-steps of:
   calculating a weighted average of the projected points associated with operating points in the first set wherein the single rising point has a weighting factor corresponding to the sum of the weighting factors of the consolidated projected points; and
   determining a weighted variance of the projected points associated with operating points in the first set;
   adding the weighting variance to the weighted average associated with the single rising point.

32. The method of claim 28 wherein said falling point consolidating step includes the sub-steps of:
   calculating a weighted average of the projected points associated with operating points in the second set wherein the single falling point has a weighting factor corresponding to the sum of the weighting factors of the consolidated projected points;
   determining a weighted variance of the projected points associated with operating points in the second set;
   subtracting the weighting variance from the weighted average associated with the single falling point.

33. The method of claim 1 wherein said step of selectively realigning the unadjusted control points includes the sub-step of:
   determining a ratio between adjusted and unadjusted values of the control point; and
   scaling unadjusted control points using the ratio.

* * * * *